(12) United States Patent
Ninomiya

(10) Patent No.: US 11,179,973 B2
(45) Date of Patent: Nov. 23, 2021

(54) TIRE

(71) Applicant: Sumitomo Rubber Industries, Ltd., Kobe (JP)

(72) Inventor: Hiroaki Ninomiya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 510 days.

(21) Appl. No.: 16/049,170

(22) Filed: Jul. 30, 2018

(65) Prior Publication Data

US 2019/0054771 A1 Feb. 21, 2019

(30) Foreign Application Priority Data

Aug. 21, 2017 (JP) .............................. JP2017-158810

(51) Int. Cl.
| | |
|---|---|
| *B60C 11/11* | (2006.01) |
| *B60C 11/12* | (2006.01) |
| *B60C 11/03* | (2006.01) |
| *B60C 11/13* | (2006.01) |

(52) U.S. Cl.
CPC .......... *B60C 11/11* (2013.01); *B60C 11/0332* (2013.01); *B60C 11/1204* (2013.01); *B60C 11/1384* (2013.01); *B60C 11/1392* (2013.01); *B60C 2011/0346* (2013.01); *B60C 2011/0353* (2013.01); *B60C 2011/0358* (2013.01); *B60C 2011/1209* (2013.01); *B60C 2011/1213* (2013.01); *B60C 2200/14* (2013.01)

(58) Field of Classification Search
CPC . B60C 11/11; B60C 11/1204; B60C 11/0332; B60C 2011/1213; B60C 2011/0346
See application file for complete search history.

(56) References Cited

U.S. PATENT DOCUMENTS

| | | | | |
|---|---|---|---|---|
| 6,102,093 | A * | 8/2000 | Nakagawa | B60C 11/11 |
| | | | | 152/209.18 |
| 2011/0192514 | A1* | 8/2011 | Ochi | B60C 11/11 |
| | | | | 152/209.18 |
| 2014/0209225 | A1* | 7/2014 | Kuroda | B60C 11/0306 |
| | | | | 152/209.18 |
| 2017/0036489 | A1* | 2/2017 | Fujita | B60C 11/1204 |

FOREIGN PATENT DOCUMENTS

JP 5503775 B1 5/2014

* cited by examiner

*Primary Examiner* — Jacob T Minskey
*Assistant Examiner* — Adrien J Bernard
(74) *Attorney, Agent, or Firm* — Birch, Stewart, Kolasch & Birch, LLP

(57) ABSTRACT

A tire comprises a tread portion 2. The tread portion 2 has a repeated pattern portion 7 in which a plurality of minimum pattern constituent units 8 is arranged in a tire circumferential direction. Each of the minimum pattern constituent units 8 includes a center block 10, a plurality of surrounding blocks 11 surrounding the center block 10, and dividing grooves 15 each arranged between adjacent ones of the plurality of the surrounding blocks 11. The dividing grooves 15 include first dividing grooves 16 and second dividing grooves 17 inclined in opposite directions to each other.

17 Claims, 6 Drawing Sheets

TIRE

TECHNICAL FIELD

The present invention relates to a tire suitable for running on snow.

BACKGROUND ART

For example, Japanese Patent No. 5503775 has proposed a tire in which a tread portion is provided with two circumferential grooves, lateral grooves each having an opening connected with each of the circumferential grooves, and blocks divided by the circumferential grooves and the lateral grooves. Further, the above-mentioned blocks are subdivided by shallow grooves.

The above-described tire is supposed to be used for running on muddy roads, but it is likely that sufficient performance cannot be exerted on a dry road surface and on a snowy road surface, therefore, there has been a demand for improvement.

SUMMARY OF THE INVENTION

The present invention was made in view of the above, and a primary object thereof is to provide a tire capable of improving steering stability on a dry road surface and on-snow performance.

In one aspect of the present invention, a tire comprises a tread portion, wherein the tread portion has a repeated pattern portion in which a plurality of minimum pattern constituent units is arranged in a tire circumferential direction, each of the minimum pattern constituent units 8 includes a center block, a plurality of surrounding blocks surrounding the center block, and dividing grooves each arranged between adjacent ones of the plurality of the surrounding blocks, and the dividing grooves include first dividing grooves and second dividing grooves inclined in opposite directions to each other.

In another aspect of the invention, it is preferred that each of the minimum pattern constituent units has four surrounding blocks.

In another aspect of the invention, it is preferred that a ground contacting surface of each of the surrounding blocks has a larger area than a ground contacting surface of the center block.

In another aspect of the invention, it is preferred that the surrounding blocks include a first block adjacent to the center block on at least one side in a tire axial direction.

In another aspect of the invention, it is preferred that the first block has a larger length in the tire circumferential direction than that of the center block.

In another aspect of the invention, it is preferred that the first block has two longitudinal side walls arranged on both sides in the tire axial direction, and each of the longitudinal side walls is concave toward a centroid of a ground contacting surface of the first block.

In another aspect of the invention, it is preferred that the surrounding blocks include a second block adjacent to the center block on at least one side in the tire circumferential direction.

In another aspect of the invention, it is preferred that the second block has a larger length in the tire axial direction than that of the center block.

In another aspect of the invention, it is preferred that the second block has a triangular ground contacting surface surrounded by a first edge, a second edge, and a third edge, the first edge and the second edge being inclined in the same direction with respect to the tire axial direction, and the third edge being inclined in an opposite direction to the first edge and the second edge.

In another aspect of the invention, it is preferred that each of the surrounding blocks is divided by a plurality of grooves each having a same depth.

In another aspect of the invention, it is preferred that the center block has a quadrangular ground contacting surface surrounded by four edges.

DESCRIPTION OF THE PREFERRED EMBODIMENT

An embodiment of the present invention will now be described below in detail.

Figure 1:
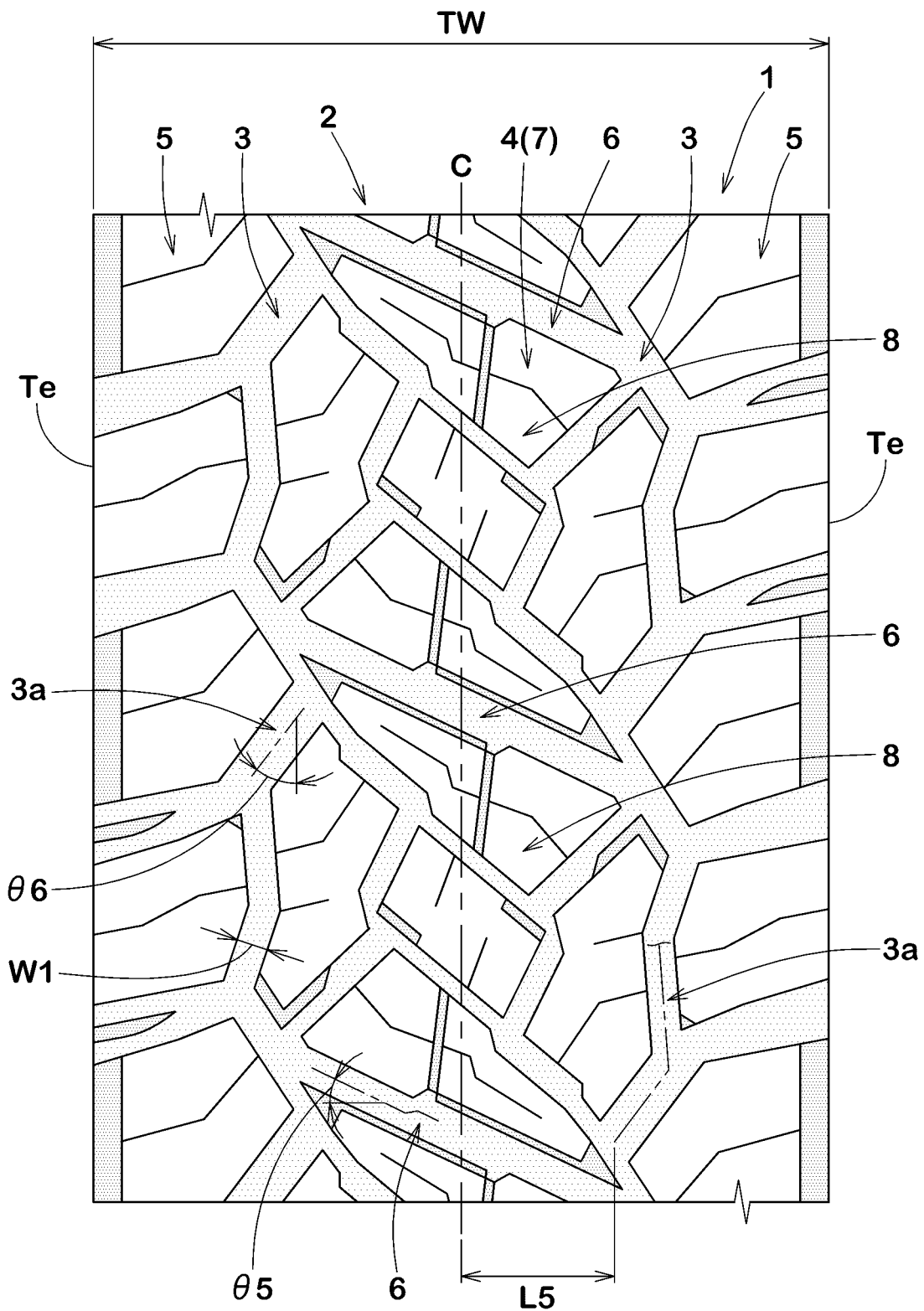
FIG. 1 is a development view of a tread portion of a tire as an embodiment of the present invention.

FIG. 1 is a development view of a tread portion 2 of a tire in this embodiment (hereinafter, may be simply referred to as "tire") 1. As shown in FIG. 1, the tire 1 in this embodiment is suitably used as a pneumatic tire for suv (sport utility vehicle) which is supposed to run on rough terrain, for example. However, the tire 1 of the present invention is not limited to such an embodiment.

The tread portion 2 of the tire 1 has a repeated pattern portion 7 in which a plurality of minimum pattern constituent units 8 is arranged in a tire circumferential direction. The repeated pattern portion 7 in this embodiment is provided in a center portion in a tire axial direction of the tread portion 2. However, the repeated pattern portion 7 may be provided in other portions. Further, the repeated pattern portion 7 is not limited to those in which the minimum pattern constituent units 8 are completely identical in shape, and for example, a difference in shape of each minimum pattern constituent unit 8 due to variable pitch or the like can be tolerated.

Figure 2:
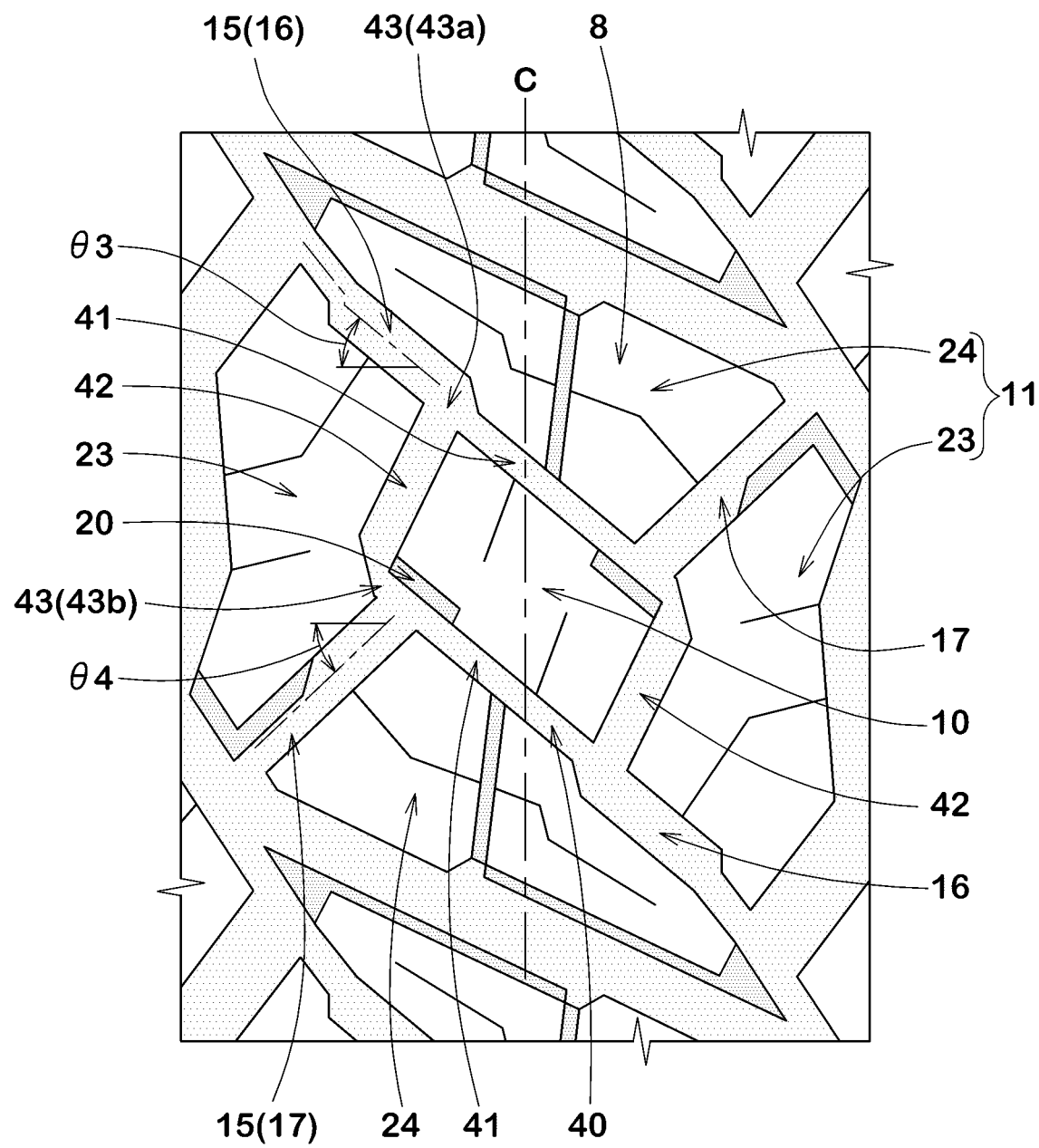
FIG. 2 is an enlarged view of one of minimum pattern constituent units of a crown land region of FIG. 1.

FIG. 2 is an enlarged view of one of the minimum pattern constituent units 8. As shown in FIG. 2, each of the minimum pattern constituent units 8 includes a center block 10, a plurality of surrounding blocks 11 surrounding the center block 10, and dividing grooves 15 each arranged between adjacent ones of the plurality of the surrounding blocks 11. Further, the dividing grooves 15 include first dividing grooves 16 and second dividing grooves 17 which are inclined in opposite directions to the first dividing grooves.

In each of the minimum pattern constituent units 8 of the present invention, the center block 10 and the surrounding blocks 11 cooperate to provide high rigidity when running on a dry road surface, therefore, it is possible that excellent steering stability is exerted. Further, the first dividing grooves 16 and the second dividing grooves 17 described above provide snow shearing force in various directions during running on snow, therefore, it is possible that the on-snow performance is improved. Furthermore, each of the surrounding blocks 11 divided by the first dividing grooves 16 and the second dividing grooves 17 is likely to be deformed in a direction different from that of the center block 10 during running on snow. Therefore, when running on snow, snow that has entered grooves between the center block 10 and the surrounding blocks 11 and each of the dividing grooves 15 is effectively discharged, thereby, excellent on-snow performance is exerted over a long period of time.

In order to further exert the above-mentioned effects, it is preferred that the center blocks 10 are provided on a tire equator C, for example. Thereby, large ground contact pressure is applied to the center blocks 10, therefore, it is possible that the center blocks 10 exert large reaction force when running on snow.

Figure 3:
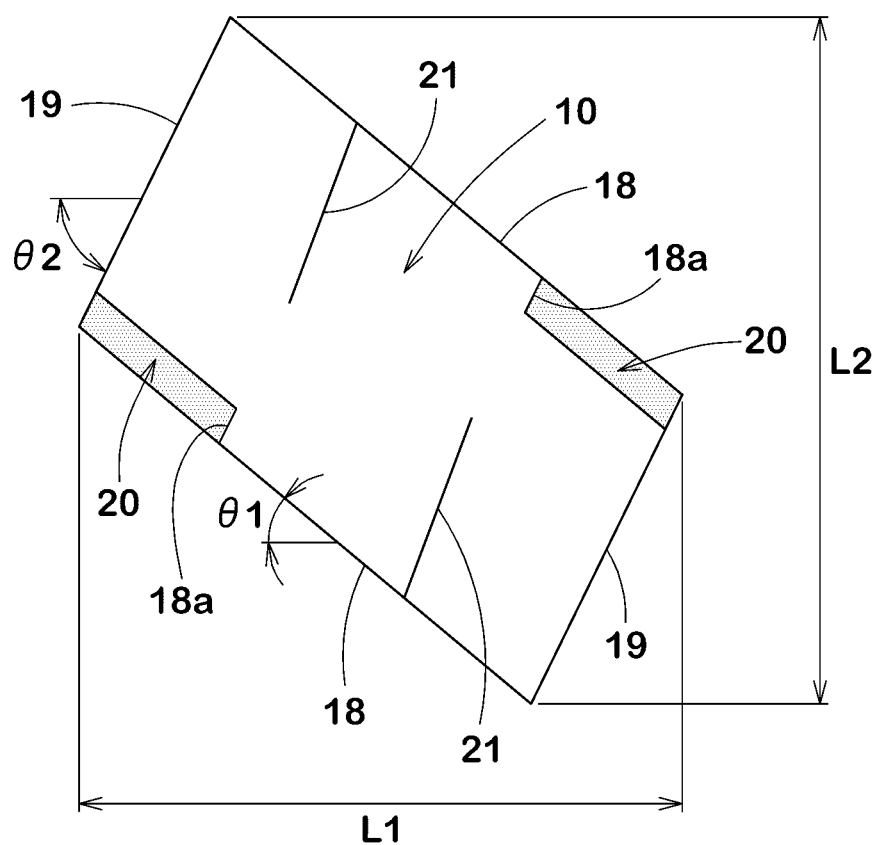
FIG. 3 is an enlarged view of a center block of FIG. 2.

FIG. 3 is an enlarged view of one of the center blocks 10. As shown in FIG. 3, each of the center blocks 10 has a quadrangular ground contacting surface surrounded by four edges, for example. Note that each of the edges includes not only a completely straight line but also a partially curved edge, for example. Therefore, the quadrangular ground contacting surface is not limited only to the ground contacting surface surrounded by the four completely straight edges, but may be the ground contacting surface surrounded by one or more partially curved edges or the ground contacting surface of which corner portion or corner portions are rounded.

The edges of the center block 10 include two first inclined edges 18 inclined in the same direction as the first dividing grooves 16 and two second inclined edges 19 inclined in the opposite direction to the first inclined edges 18, for example. At least one, each in this embodiment, of the first inclined edges 18 includes a partial bent portion 18a, for example. The second inclined edges 19 extend straight, for example.

It is preferred that an angle θ1 of each of the first inclined edges 18 with respect to the tire axial direction is in a range of from 30 to 50 degrees, for example.

It is preferred that each of the second inclined edges 19 is inclined at an angle θ2 larger than the angle θ1 with respect to the tire axial direction, for example. Specifically, it is preferred that the angle θ2 of each of the second inclined edges 19 with respect to the tire axial direction is in a range of from 60 to 70 degrees with respect to the tire axial direction, for example. The center blocks 10 in this embodiment also deflects in the tire axial direction in accelerating condition or braking condition on snow, therefore, it is possible that clogging of snow in each of the grooves is suppressed.

It is preferred that a length L1 in the tire axial direction of each of the center blocks 10 is in a range of from 0.15 to 0.30 times a tread width TW, for example. As shown in FIG. 1, the tread width TW is a distance in the tire axial direction between tread edges Te on both sides of the tire 1 in a standard state.

The standard state is a state in which the tire 1 is mounted on a standard rim, inflated to a standard pressure, and loaded with no tire load. In this specification, unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tread edges Te are defined as outermost ground contacting positions in the tire axial direction when the tire 1 in the standard state is in contact with a flat surface with zero camber angles by being loaded with a standard tire load.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

As shown in FIG. 3, it is preferred that a length L2 in the tire circumferential direction of each of the center blocks 10 is in a range of from 0.20 to 0.30 times the tread width TW, for example.

It is preferred that each of the center blocks 10 has at least one chamfered portion 20 formed by cutting out a corner portion formed by the ground contacting surface of the center block and one of side walls thereof, for example. The chamfered portion 20 in this embodiment is provided at one of end portions in the tire axial direction of each of the first inclined edges 18. The chamfered portion 20 can improve chipping resistance performance which is anti-chipping property of the block. Note that, for ease of understanding the chamfered portion, in each of the drawings of the present specification, each of the chamfered portions of each of the blocks and each of relatively shallow grooves is shaded with different hatching from those of the grooves which divide each of the blocks.

It is preferred that at least one sipe 21, two sipes in this embodiment, is provided in each of the center blocks 10, for example. Each of the sipes 21 of the center blocks 10 extends from one of the first inclined edges 18 and terminates within the respective block, for example. Each of the sipes 21 of the center blocks 10 in this embodiment extends along the second inclined edges 19, for example. The sipes 21 configured as such make it easy for the blocks to deform moderately, and eventually, it is possible that the clogging of snow in each of the grooves is suppressed. Note that, in this specification, the term "sipe" means a cut or a groove having a width less than 1.5 mm. It is preferred that each of the sipes 21 has a depth not less than 1.0 mm, for example. Thereby, it is possible that the clogging of snow in each of the grooves is further suppressed.

As shown in FIG. 2, each of the minimum pattern constituent units 8 in this embodiment has, for example, 2 to 8, 4 in this embodiment, surrounding blocks 11. The surrounding blocks 11 include at least one first block 23, two first blocks in this embodiment, and at least one second block 24, two second blocks in this embodiment, for example.

In each of the minimum pattern constituent units 8, each of the first blocks 23 is adjacent to the center block 10 on at least one side in the tire axial direction, for example. When stress in the tire axial direction is applied to the tread portion 2, the first blocks 23 get close to the center block 10, therefore, it is possible that high rigidity is exerted, for example. As a preferred embodiment, the first blocks 23 in this embodiment are provided on both sides in the tire axial direction of the center block 10.

Figure 4A:
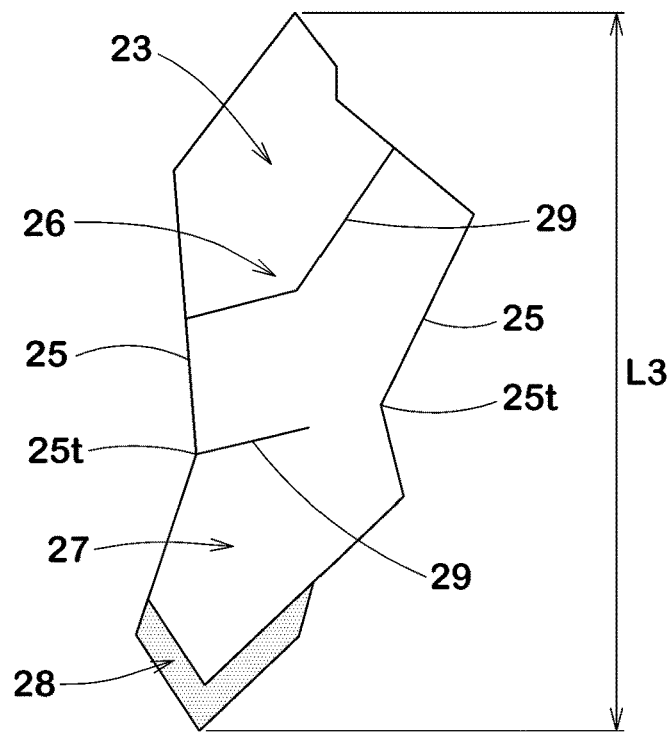
FIG. 4A is an enlarged view of one of first blocks of FIG. 2.

FIG. 4A is an enlarged view of one of the first blocks 23. As shown in FIG. 4A, each of the first blocks 23 has a longitudinally elongated shape in which a length thereof in the tire circumferential direction is larger than a length thereof in the tire axial direction, for example. It is preferred that the first block 23 in this embodiment has a length L3 in the tire circumferential direction larger than that of the center block 10, for example. It is preferred that the length L3 of the first block 23 is in a range of from 1.50 to 1.70 times the length L2 in the tire circumferential direction of the center block 10, for example. The first blocks 23 configured as such can provide large reaction force in the tire axial direction when running on snow. Further, the first blocks 23 configured as such can exert excellent chipping resistance performance.

The first block 23 has two longitudinal side walls 25 arranged on both sides in the tire axial direction. It is preferred that each of the longitudinal side walls 25 is concave toward a centroid of the ground contacting surface of the first block 23, for example. The longitudinal side walls 25 configured as such can provide larger reaction force in the tire axial direction when running on snow.

Each of the first blocks 23 includes a first portion 26 and a second portion 27 that are divided by a straight line (not shown) connecting most concave bottom points 25t of respective longitudinal side walls 25, for example. It is preferred that the second portion 27 has a smaller area of the ground contacting surface than that of the first portion 26, for example. In each of the first blocks 23 configured as such, the second portion 27 is easily deformed moderately, and eventually it is possible that the clogging of snow in the grooves is suppressed.

It is preferred that each of the first blocks 23 has a chamfered portion 28 formed by cutting out a corner portion formed by the ground contacting surface and side walls of the block, for example. The chamfered portion 28 in this embodiment is provided at an end portion in the tire circumferential direction of the second portion 27. Thereby, the chipping resistance performance is improved.

It is preferred that each of the first blocks 23 is provided with a plurality of sipes 29, for example. one of the sipes 29 of the first block 23 is arranged in the first portion 26, extending from one of edges on a side of the first dividing groove 16 so as to cross the first portion 26, for example. Another one of the sipes 29 of the first block 23 extends from the bottom point 25t of one of the longitudinal side wall 25 on a side of the tread edge Te and terminates within the block, for example.

As shown in FIG. 2, in each of the minimum pattern constituent units 8, each of the second blocks 24 is adjacent to the center block 10 on at least one side in the tire circumferential direction. When stress in the tire circumferential direction is applied to the tread portion 2, the second blocks 24 get close to the center block 10, therefore, it is possible that high rigidity is exerted, for example. As a preferred embodiment, the second blocks 24 in this embodiment are provided on both sides in the tire circumferential direction of the center block 10.

Figure 4B:
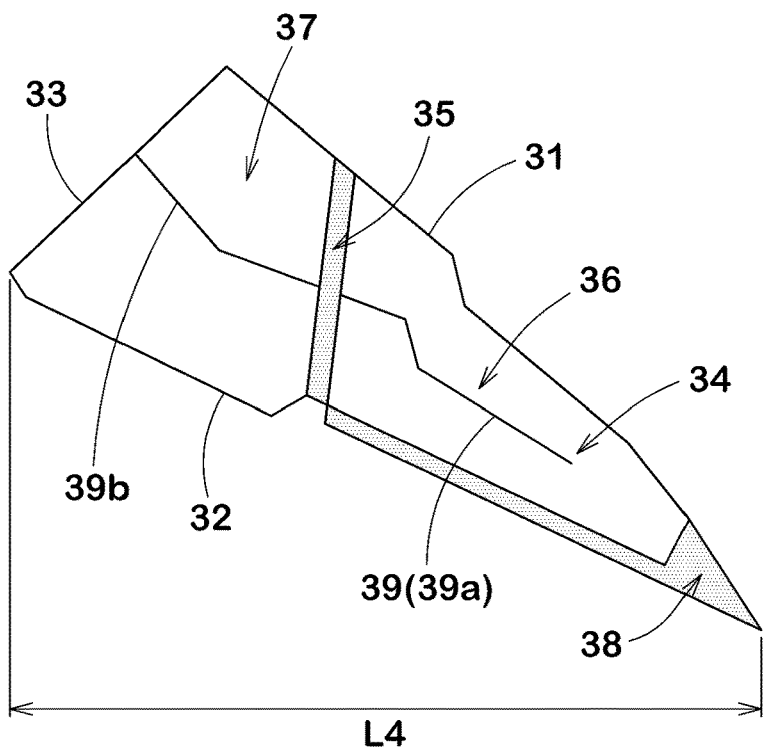
FIG. 4B is an enlarged view of one of second blocks of FIG. 2.

FIG. 4B is an enlarged view of one of the second blocks 24. As shown in FIG. 4B, each of the second blocks 24 has a laterally elongated shape in which a length thereof in the tire axial direction is larger than a length thereof in the tire circumferential direction, for example. It is preferred that the second block 24 in this embodiment has a length L4 in the tire axial direction larger than that of the center block 10. It is preferred that the length L4 of the second block 24 is in a range of from 1.85 to 2.00 times the length L1 in the tire axial direction of the center block 10, for example. The second blocks 24 configured as such can improve the steering stability on a dry road surface and the on-snow performance in a good balance.

The second block 24 has a triangular ground contacting surface surrounded by a first edge 31, a second edge 32, and a third edge 33, for example. Note that, each of the edges includes not only a completely straight line but also a partially curved edge, for example. Thereby, the triangular ground contacting surface is not limited to the ground contacting surface surrounded by three completely straight edges, but may be the ground contacting surface surrounded by one or more partially curved edges or the ground contacting surface of which corner portion or corner portions are rounded.

The first edge 31 and the second edge 32 are inclined in the same direction with respect to the tire axial direction, for example. The first edge 31 is arranged on a side of the center block 10, for example. The second edge 32 is inclined at a smaller angle than the first edge with respect to the tire axial direction. The third edge 33 is inclined in a direction opposite to those of the first edge 31 and the second edge 32, for example. The third edge 33 has a smaller length than those of the first edge 31 and the second edge 32, for example.

Due to each of the edges described above, the ground contacting surface of the second block 24 has a laterally elongated apex portion 34 convex toward one side in the tire axial direction between the first edge 31 and the second edge 32. The laterally elongated apex portion 34 configured as such is easy to bend in the tire circumferential direction, therefore, it is possible that clogging of snow in each of the grooves is suppressed, and eventually it is possible that excellent on-snow performance is exerted over a long period of time.

Each of the second blocks 24 is provided with a shallow groove 35 extending in the tire circumferential direction, for example. It is preferred that a groove depth of the shallow groove 35 is in a range of from 0.5 to 1.0 times a groove depth of each of the grooves dividing the blocks, for example. Thereby, the second block 24 has a first portion 36 and a second portion 37 divided by the shallow groove 35. The first portion 36 has a triangular ground contacting surface, for example. The second portion 37 has a quadrangular ground contacting surface, for example. The first portion 36 and the second portion 37 can deform substantially integrally when running.

It is preferred that the second block 24 has a chamfered portion 38 formed by cutting off a corner portion formed by the ground contacting surface and side walls, for example. It is preferred that the chamfered portion 38 in this embodiment is provided in a region including a tip portion of the first portion 36. Thereby, it is possible that chipping of the laterally elongated apex portion 34 is suppressed.

It is preferred that each of the first portion 36 and the second portion 37 is provided with a sipe 39. A sipe 39a provided in the first portion 36 extends from the shallow groove 35 and terminates within the block, for example. A sipe 39b provided in the second portion 37 extends from the shallow groove 35 and completely crosses the second portion 37, for example. Thereby, the second block 24 is easily deformed appropriately, and eventually the steering stability on a dry road surface and the on-snow performance are improved in a good balance.

As shown in FIG. 2, it is preferred that the ground contacting surface of each of the surrounding blocks 11 has an area s2 larger than the ground contacting surface of the center block 10. The area s2 of the ground contacting surface of each of the surrounding blocks 11 is preferably not less than 1.05 times, more preferably not less than 1.10 times, and preferably not more than 1.70 times, more preferably not more than 1.40 times an area S1 of the ground contacting surface of the center block 10. The surrounding blocks 11 configured as such can improve the steering stability on a dry road surface and the on-snow performance in a good balance.

It is preferred that an angle θ3 of each of the first dividing grooves 16 with respect to the tire axial direction and an angle θ4 of each of the second dividing grooves 17 with respect to the tire axial direction are in a range of from 30 to 55 degrees with respect to the tire axial direction, for example. The first dividing grooves 16 and the second dividing grooves 17 configured as such can exert the snow shearing force in a good balance in the tire axial direction and the tire circumferential direction.

It is preferred that a groove width of each of the first dividing grooves 16 is decreased on a side of the tread edge Te, for example. In each of the first dividing grooves 16 configured as such, it is possible that snow is firmly compressed at the portion having the decreased groove width.

In this embodiment, it is preferred that each of the chamfered portions 20 of the center block 10 is provided on an extension in a longitudinal direction of adjacent one of the second dividing grooves 17. Thereby, during running on snow, snow pushed away by the ground contacting surface of the center block 10 is likely to enter the second dividing grooves 17, and consequently it is possible that the second dividing grooves 17 form harder snow blocks.

Between the center block 10 and the surrounding blocks 11, an annular groove 40 for dividing them is provided. The annular groove 40 includes two first groove portions 41 extending along the first inclined edges 18 of the center block 10 and two second groove portions 42 extending along the second inclined edges 19 of the center block 10, for example. Thereby, the annular groove 40 has four bent portions 43 in each of which one of the first groove portions 41 and one of the second groove portions 42 intersect. The bent portions 43 include two first bent portions 43a that are convex in the tire circumferential direction and second bent portions 43b that are convex in the tire axial direction, for example.

It is preferred that each of the first groove portions 41 extends with a constant groove width, for example. It is preferred that each of the second groove portions 42 has a groove width larger than that of each of the first groove portion 41, for example. The second groove portions 42 provide large snow shearing force in the tire axial direction when running on snow, therefore, it is possible that the cornering performance on snow is improved.

Each of the first bent portions 43a is connected with one of the first dividing grooves 16, for example. Each of the second bent portions 43b is connected with one of the second dividing grooves 17, for example. In this embodiment, the second dividing groove 17 is connected with the second bent portion 43b on a side of the first groove portion 41 of an apex of the second bent portion 43b. Thereby, when running on snow, hard snow blocks are formed by three-way paths formed by each of the groove portions of the annular grooves 40 and the dividing grooves 15, therefore, it is possible that excellent on-snow performance is obtained.

It is preferred that each of the annular grooves 40 and each of the dividing grooves 15 has the same depth, for example. Thereby, it is preferred that each of the surrounding blocks 11 is divided by a plurality of the grooves having the same depth. Therefore, rigidity distribution of each of the blocks becomes uniform, thereby, the steering stability and the chipping resistance performance on a dry road surface are improved.

As shown in FIG. 1, the minimum pattern constituent units 8 in this embodiment are divided by a plurality of lateral grooves 6, for example. The lateral grooves 6 extend obliquely in one direction with respect to the tire axial direction, for example. Each of the lateral grooves 6 is inclined in the same direction with respect to the tire axial direction, for example. The lateral grooves 6 in this embodiment are inclined in the same direction as the first dividing grooves 16 and the first groove portions 41 of the annular grooves 40, for example. It is preferred that an angle θ5 of each of the lateral grooves 6 with respect to the tire axial direction is in a range of from 20 to 30 degrees, for example. It is preferred that each of the lateral grooves 6 has the same groove depth as each of the dividing grooves 15 and the annular grooves 40, for example.

The tread portion 2 in this embodiment is provided with main grooves 3 extending continuously in the tire circumferential direction on both sides in the tire axial direction of the repeated pattern portion 7, for example. It is preferred that the main grooves 3 extend in a zigzag manner, for example. In another embodiment of the present invention, the main grooves 3 may extend linearly along the tire circumferential direction, for example.

Each of the main grooves 3 has a plurality of inclined portions 3a inclined at an angle not more than 45 degrees with respect to the tire circumferential direction. In a preferred embodiment, a maximum angle θ6 of the inclined portions 3a of the main grooves 3 is in a range of from 10 to 30 degrees, for example.

It is preferred that each of the main grooves 3 is configured such that a distance L5 between a groove center line thereof and the tire equator c is in a range of from 0.20 to 0.35 times the tread width TW, for example.

It is preferred that each of the main grooves 3 has a groove width w1 in a range of from 3.0% to 7.0% of the tread width TW, for example. In a case of a tire for Suv, it is preferred that each of the main grooves 3 has a groove depth in a range of from 10 to 20 mm, for example.

The tread portion 2 has a so-called three-rib structure having a crown land region 4 having the repeated pattern portion 7 described above and shoulder land regions 5 each arranged on an outer side in the tire axial direction of respective one of the main grooves 3, for example. However, the tread portion 2 is not limited to such an embodiment.

Figure 5:
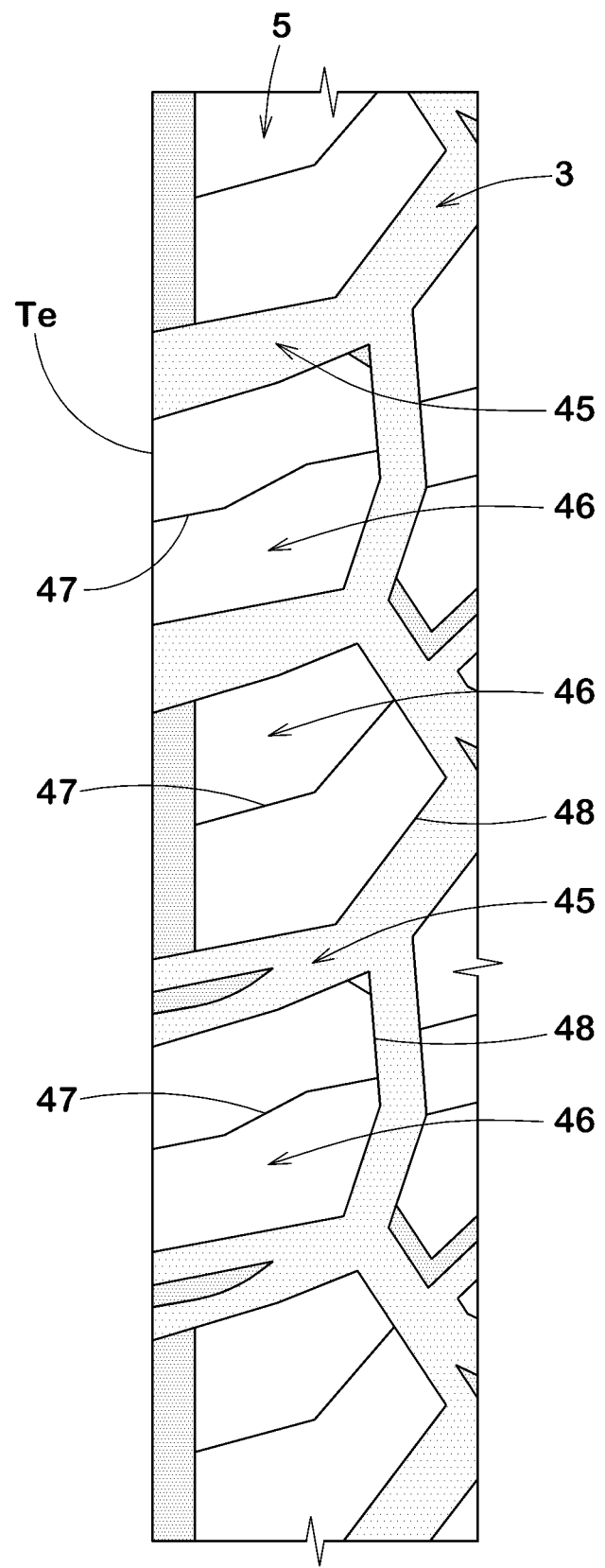
FIG. 5 is an enlarged view of one of shoulder land regions.

FIG. 5 is an enlarged view of one of the shoulder land regions 5. As shown in FIG. 5, each of the shoulder land regions 5 includes shoulder blocks 46 divided by shoulder lateral grooves 45.

It is preferred that each of the shoulder lateral grooves 45 is inclined in the opposite direction to the lateral grooves 6 that divide the repeated pattern portion 7 described above with respect to the tire axial direction, for example. It is preferred that a groove width of each of the shoulder lateral grooves 45 is gradually increased toward adjacent one of the tread edges Te, for example.

It is preferred that each of the shoulder blocks 46 has a pentagonal ground contacting surface surrounded by five edges, for example. Further, it is preferred that an inner side wall 48 located on an inner side in the tire axial direction of each of the shoulder blocks 46 is convex toward the inner side in the tire axial direction, for example.

It is preferred that each of the shoulder blocks 46 is provided with a shoulder sipe 47, for example. Each of the shoulder sipes 47 extends between respective one of the main grooves 3 and its adjacent one of the tread edges Te so as to completely cross the block, for example. It is preferred that each of the shoulder sipes 47 is partially bent, for example. The shoulder sipes 47 configured as such maintain rigidity of the shoulder blocks 46, therefore, they are helpful for improving the chipping resistance performance.

while detailed description has been made of the tire as an embodiment of the present invention, the present invention can be embodied in various forms without being limited to the above illustrated embodiment.

WORKING EXAMPLE (EXAMPLE)

Figure 6:
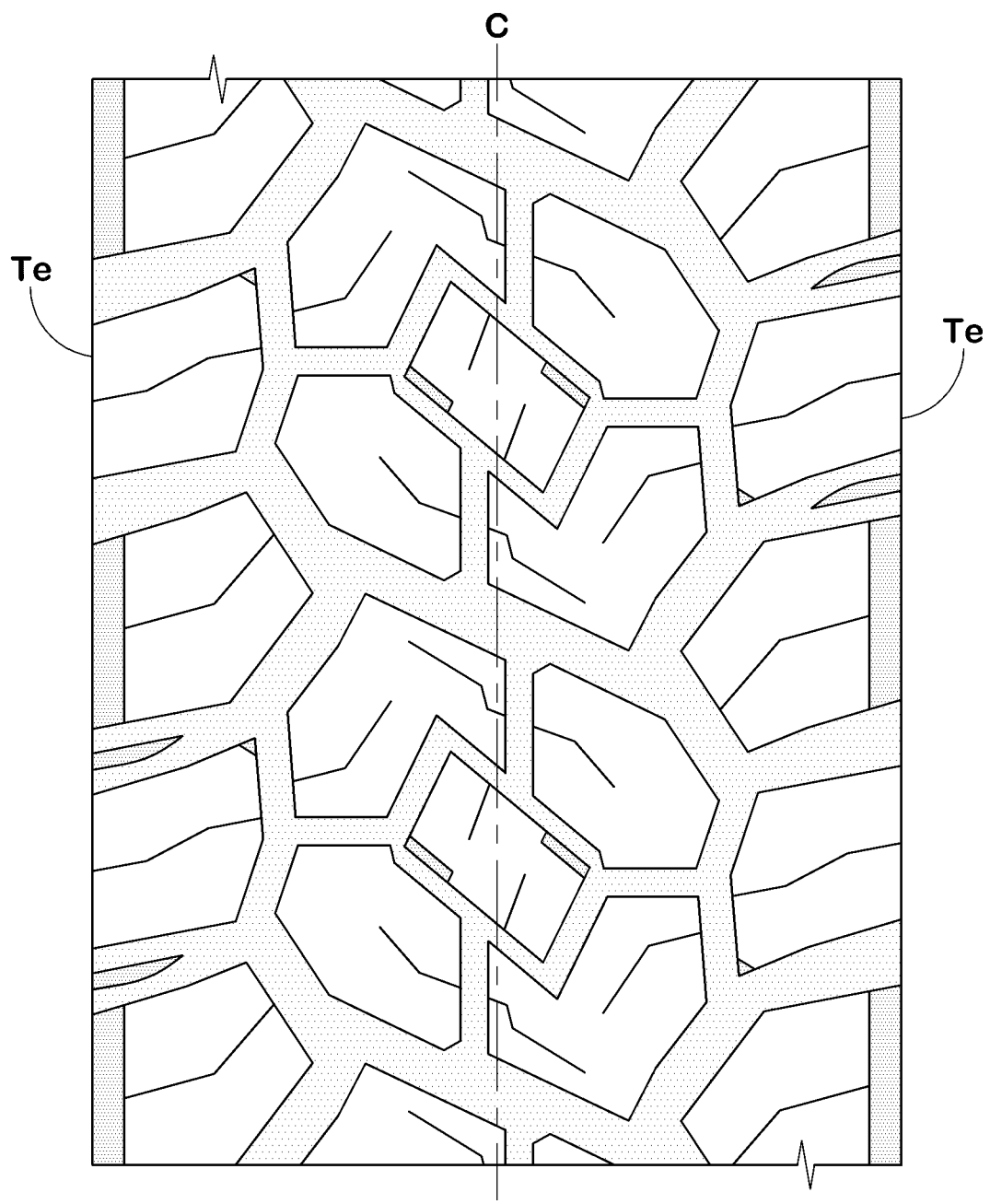
FIG. 6 is a development view of a tread portion of a tire as a reference.

Tires of size 35×12.50R15 having the basic tread pattern shown in FIG. 1 were made by way of test according to the specifications listed in Table 1. As Reference, as shown in FIG. 6, a tire in which the surrounding blocks are divided by the dividing grooves extending along the tire circumferential direction and the dividing grooves extending along the tire axial direction was manufactured by way of test. Each of the test tires was tested for the steering stability on a dry road surface and the on-snow performance. Common specifications of the test tires and the test methods are as follows.

Test car: 4WD-car with displacement of 4000 cc
Test tire mounting position: all wheels
Tire rim: 15×9.5
Tire inner pressure: 350 kPa at front wheels, 500 kPa at rear wheels <Steering Stability on Dry Road Surface> while a driver drove the test car on a dry road surface of a circuit course, the steering stability was evaluated by the driver's feeling. The results are indicated by an evaluation point based on the Reference being 100, wherein the larger the numerical value, the better the steering stability on a dry road surface is.

<On-Snow Performance>

The performance was evaluated by the driver's feeling while the driver drove the test car on snow. The results are indicated by an evaluation point based on the Reference being 100, wherein the larger the numerical value, the better the on-snow performance is.

The test results are shown in Table 1.

TABLE 1

| Figure showing tread pattern | Ref. FIG. 6 | Ex. 1 FIG. 1 | Ex. 2 FIG. 1 | Ex. 3 FIG. 1 | Ex. 4 FIG. 1 | Ex. 5 FIG. 1 | Ex. 6 FIG. 1 | Ex. 7 FIG. 1 |
|---|---|---|---|---|---|---|---|---|
| Maximum angle θ6 of Inclined portions of Main grooves [degree] | 25 | 25 | 10 | 15 | 20 | 30 | 25 | 25 |
| Angle θ3 of First dividing groove [degree] | 90 | 40 | 40 | 40 | 40 | 40 | 25 | 30 |
| Angle θ4 of Second dividing groove [degree] | 0 | 45 | 45 | 45 | 45 | 45 | 30 | 35 |
| Maximum area S2 of Ground contacting surfaces of Surrounding blocks/Area S1 of Ground contacting surface of Center block | 1.15 | 1.15 | 1.15 | 1.15 | 1.15 | 1.15 | 1.15 | 1.15 |
| Steering stability on Dry road surface [evaluation point] | 100 | 102 | 102 | 102 | 102 | 101 | 102 | 102 |
| On-snow performance [evaluation point] | 100 | 106 | 103 | 105 | 106 | 106 | 103 | 105 |

| Figure showing tread pattern | Ex. 8 FIG. 1 | Ex. 9 FIG. 1 | Ex. 10 FIG. 1 | Ex. 11 FIG. 1 | Ex. 12 FIG. 1 | Ex. 13 FIG. 1 | Ex. 14 FIG. 1 | Ex. 15 FIG. 1 |
|---|---|---|---|---|---|---|---|---|
| Maximum angle θ6 of Inclined portions of Main grooves [degree] | 25 | 25 | 25 | 25 | 25 | 25 | 25 | 25 |
| Angle θ3 of First dividing groove [degree] | 35 | 45 | 50 | 55 | 40 | 40 | 40 | 40 |
| Angle θ4 of Second dividing groove [degree] | 40 | 50 | 55 | 60 | 45 | 45 | 45 | 45 |
| Maximum area S2 of Ground contacting surfaces of Surrounding blocks/Area S1 of Ground contacting surface of Center block | 1.15 | 1.15 | 1.15 | 1.15 | 1.05 | 1.10 | 1.40 | 1.70 |
| Steering stability on Dry road surface [evaluation point] | 102 | 102 | 101 | 100 | 102 | 102 | 101 | 100 |
| On-snow performance [evaluation point] | 106 | 106 | 106 | 105 | 105 | 106 | 106 | 105 |

From the test results, it was confirmed that the tires as the Examples exerted excellent steering stability on a dry road surface and the on-snow performance.

The invention claimed is:

1. A tire comprising a tread portion, wherein
the tread portion has a repeated pattern portion in which a plurality of minimum pattern constituent units is arranged in a tire circumferential direction,
each of the minimum pattern constituent units includes a center block, a plurality of surrounding blocks surrounding the center block, and dividing grooves each arranged between adjacent ones of the plurality of the surrounding blocks,
the dividing grooves include first dividing grooves and second dividing grooves inclined in opposite directions to each other,
the surrounding blocks include a pair of first blocks adjacent to the center block on both sides in a tire axial direction and a pair of second blocks adjacent to the center block on both sides in the tire circumferential direction, and
each of the pair of first blocks overlaps both the pair of second blocks in the tire circumferential direction and the tire axial direction.

2. The tire according to claim 1, wherein
each of the minimum pattern constituent units has four surrounding blocks.

3. The tire according to claim 1, wherein
a ground contacting surface of each of the surrounding blocks has a larger area than a ground contacting surface of the center block.

4. The tire according to claim 1, wherein
the first blocks each has two longitudinal side walls arranged on both sides in the tire axial direction, and
each of the longitudinal side walls is concave toward a centroid of a ground contacting surface of each first block.

5. The tire according to claim 1, wherein
the second blocks each has a larger length in the tire axial direction than that of the center block.

6. The tire according to claim 1, wherein
each second block has a triangular ground contacting surface surrounded by a first edge, a second edge, and a third edge, the first edge and the second edge being inclined in the same direction with respect to the tire axial direction, and the third edge being inclined in an opposite direction to the first edge and the second edge.

7. The tire according to claim 1, wherein
each of the surrounding blocks is divided by a plurality of grooves each having a same depth.

8. The tire according to claim 1, wherein
the center block has a quadrangular ground contacting surface surrounded by four edges.

9. The tire according to claim 2, wherein
a ground contacting surface of each of the surrounding blocks has a larger area than a ground contacting surface of the center block.

10. A tire comprising a tread portion, wherein
the tread portion has a repeated pattern portion in which a plurality of minimum pattern constituent units is arranged in a tire circumferential direction,
each of the minimum pattern constituent units includes a center block, a plurality of surrounding blocks surrounding the center block, and dividing grooves each arranged between adjacent ones of the plurality of the surrounding blocks,
the dividing grooves include first dividing grooves and second dividing rooves inclined in opposite directions to each other,
the surrounding blocks include a pair of first blocks adjacent to the center block on both sides in a tire axial direction and a pair of second blocks adjacent to the center block on both sides in the tire circumferential direction,
each of the pair of first blocks overlaps both the pair of second blocks in the tire circumferential direction,
the tread portion is provided with a pair of main grooves extending continuously in the tire circumferential direction and a plurality of lateral grooves,
each of the minimum pattern constituent units is surrounded by the pair of main grooves and a pair of the plurality of lateral grooves that are adjacent in the tire circumferential direction, and
the minimum pattern constituent units are repeated in the tire circumferential direction and are separated by only a respective one of the lateral grooves.

11. A tire comprising a tread portion, wherein
the tread portion has a repeated pattern portion in which a plurality of minimum pattern constituent units is arranged in a tire circumferential direction,
each of the minimum pattern constituent units includes a center block, a plurality of surrounding blocks surrounding the center block, and dividing grooves each arranged between adjacent ones of the plurality of the surrounding blocks,
the dividing grooves include first dividing grooves and second dividing grooves inclined in opposite directions to each other, and
each of the minimum pattern constituent units consists of four surrounding blocks.

12. The tire according to claim 1, wherein
a length L1 in the tire axial direction of the center block is in a range of from 0.15 to 0.30 times a tread width TW.

13. The tire according to claim 12, wherein
a length L2 in the tire circumferential direction of the center block is in a range of from 0.2.0 to 0.30 times the tread width TW.

14. The tire according to claim 1, wherein
a length L3 in the tire circumferential direction of the first blocks is in a range of from 1.50 to 1.70 times a length L2 in the tire circumferential direction of the center block.

15. The tire according to claim 1, wherein
a length L4 in the tire axial direction of the second blocks is in a range of from 1.85 to 2.00 times a length L1 in the tire axial direction of the center block.

16. The tire according to claim 1, wherein
an angle θ3 of each of the first dividing grooves with respect to the tire axial direction and an angle θ4 of each of the second dividing grooves with respect to the tire axial direction are in a range of from 30 to 55 degrees with respect to the tire axial direction.

17. The tire according to claim 1, wherein
a groove width of each of the first dividing grooves is decreased on a tread edge side.

* * * * *